United States Patent

[11] 3,604,906

[72] Inventors James R. Hunter
Chadds Ford;
Ermenegildo Fiorentino, Bridgeport, both of, Pa.
[21] Appl. No. 855,344
[22] Filed Sept. 4, 1969
[45] Patented Sept. 14, 1971
[73] Assignee Burroughs Corporation
Detroit, Mich.

[54] VERIFIER FOR SIGNAL CONTROLLED MECHANISM
10 Claims, 8 Drawing Figs.

[52] U.S. Cl. .......... 235/153, 101/93 R, 178/17.5
[51] Int. Cl. .......... G06k 5/00, H03k 13/32
[50] Field of Search .......... 235/153; 340/146.1; 178/17.5, 79, 23.1; 101/93

[56] References Cited

UNITED STATES PATENTS

| | | | |
|---|---|---|---|
| 2,915,966 | 12/1959 | Jacoby | 340/146.1 X |
| 3,110,884 | 11/1963 | Scharff | 340/146.1 |
| 3,171,349 | 3/1965 | Kodis et al. | 101/93 |
| 3,246,292 | 4/1966 | Way Dong Woo | 340/146.1 |
| 3,248,692 | 4/1966 | Wei Ming Shih | 340/146.1 |
| 3,453,954 | 7/1969 | Pandolfi | 101/93 |

*Primary Examiner*—Malcolm A. Morrison
*Assistant Examiner*—Charles E. Atkinson
*Attorney*—Carl Fissell, Jr.

ABSTRACT: Apparatus for verifying the operation of mechanisms electrically controlled by operator keyboards which includes delayed electrical sensing of the activation of the mechanisms and alternate printing of data corresponding to the keyboard output signals and to the signals transduced from the operation of the mechanisms. In one version of the verifier the actuation sensing is performed by switches to set a storage means which is then read out after a predetermined delay from the time that data signals are received from the keyboard for storage or printing.

INVENTORS.
JAMES R. HUNTER
ERMENEGILDO FIORENTINO
BY George L. Kensinger
ATTORNEY INVENTORS.
JAMES R. HUNTER
ERMENEGILDO FIORENTINO
BY George L. Kensinger
ATTORNEY INVENTORS.
JAMES R. HUNTER
ERMENEGILDO FIORENTINO
BY George L. Kensinger
ATTORNEY INVENTORS.
JAMES R. HUNTER
ERMENEGILDO FIORENTINO
BY George L. Kensinger
ATTORNEY

VERIFIER FOR SIGNAL CONTROLLED MECHANISM

BACKGROUND OF THE INVENTION

This invention relates to verifier apparatus for checking the operation of signal-controlled mechanisms. More particularly, the subject invention relates to apparatus for verifying the operation of mechanisms electrically controlled by operator keyboards.

In most keyboard-controlled machines it is not possible to check separately the accuracy of the operator keying, the keyboard operation and the actuation of the mechanism itself. In many operator keyboard consoles, there is not even any visual indication of the keyboard or mechanism output to permit the operator to verify the correct entry of data into the device. This problem exists in the operation of keyboard-controlled sorting machines such as letter-sorting machines and in keyboard-controlled data input devices for data communication and data processing systems, for example.

One approach to enabling an operator to verify his accuracy in operating a keyboard-controlled machine is to provide a specialized keyboard training device as disclosed in Priednieks et al. U.S. Pat. No. 3,100,351, issued on Aug. 13, 1963, having the same assignee as this application. The use of such a training device permits an operator to verify his accuracy in the keying operation but it is often desired that the accuracy of the keyboard operation and of the actuation of the signal-controlled mechanism itself be checked or verified separately while connected in a system.

Various apparatus has previously been developed for verifying the accuracy of the keyboard function by driving a printer mechanism from the keyboard data signals, or even by requiring the operator to enter each set of data into the keyboard twice in order to permit a comparison between the successive entries, with activation of an error indicator if a discrepancy between them is detected.

Furthermore, in some systems for the transfer of data into a memory device, comparison means have been built into the keyboard machine itself for comparing the signals written into the memory with those subsequently read out from the memory to check the accuracy of data transfer into the system. Apparatus has not been provided, however, for checking separately the accuracy of keyboard operation and the accuracy of the actuation of mechanisms controlled thereby, during each cycle of keyboard operation.

SUMMARY OF THE INVENTION

Accordingly, it is an object of this invention to provide apparatus for verifying separately the operation of an operator keyboard and of an associated signal-controlled mechanism.

Another object of the subject of the invention is to permit verification of the operation of keyboard-controlled machines without requiring modification of them.

A further object of the present invention is to verify the accuracy of both an operator keyboard and associated signal-controlled mechanism without interferring with or interrupting the normal operation of the keyboard-controlled machine.

In accordance with these objects there is provided verifier apparatus for keyboard-controlled machines including a controllable actuation-sensing unit for providing data signals indicative of the operation of a signal-controlled mechanism, apparatus for storing these data signals, a sequence control unit responsive to a keyboard control signal for reading out the sensing unit and controlling the storage apparatus, and a data comparison unit for receiving keyboard output signals and comparing them with the stored actuation-sensed data signals.

Other unobvious features of the present invention and its advantages are made clear in the following description and in the attached drawings, wherein.

DETAILED DESCRIPTION OF THE PREFERRED EMBODIMENTS

Figure 1:
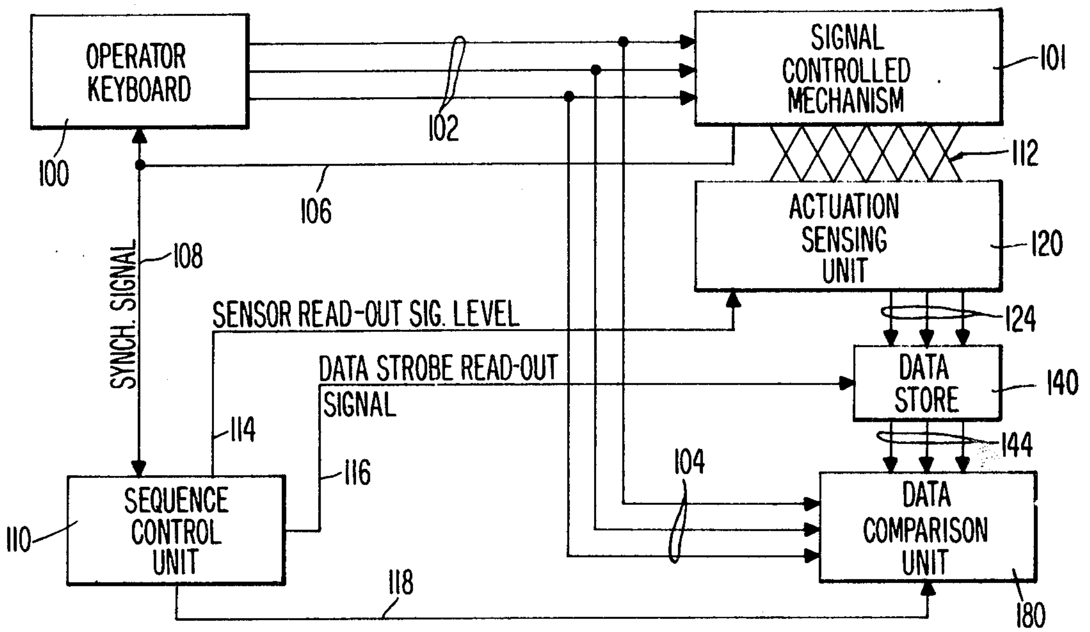
FIG. 1 is a block diagram of a verifier for keyboard-controlled machines incorporating the invention.

The drawing of FIG. 1 illustrates a verifier for a machine incorporating operator keyboard 100 and signal-controlled mechanism 101. Keyboard data signals are received by signal-controlled mechanism 101 over cable 102 and a signal is returned to the operator keyboard over conductor 106 for temporarily preventing output from the keyboard during each cycle of operation. An actuation sensing unit 120 is physically coupled to elements of signal-controlled mechanism 101 as indicated at 112.

A sequence control unit 110 is initiated by a signal received on conductor 108 which is coupled to control signal conductor 106. Actuation of the sequence control unit by this signal synchronizes the operation of the verifier apparatus with that of the keyboard-controlled machine. After a delay, the sequence control unit delivers a readout signal over conductor 114 to actuation-sensing unit 120 to enable its transducers to develop actuation sensed data signals on output cable 124.

Data store 140 is connected to output cable 124 of the sensing unit and receives readout control signals from the sequence control unit over conductor 116. Data store 140 stores data signals from cable 124 when they are received and retains them until it receives a readout signal for outputting them on cable 144.

Data comparison unit 180 receives keyboard output data signals from cable 104 and actuation-sensed data signals on cable 144. The operation of data comparison unit 180 is controlled by sequence control unit 110 through conductor 118.

During operation of the verifier, data comparison unit 180 receives keyboard output data signals over cable 104 as they become available. After the keyboard is disabled by the control signal from the signal-controlled mechanism on conductor 106, sequence control unit 110 causes readout of sensing signals from sensing unit 120 into data store 140. Subsequently, the sequence control unit reads the sensed data signals out of data store 140 into data comparison unit 180 where they are compared with the previously received keyboard output signals.

Figure 2:
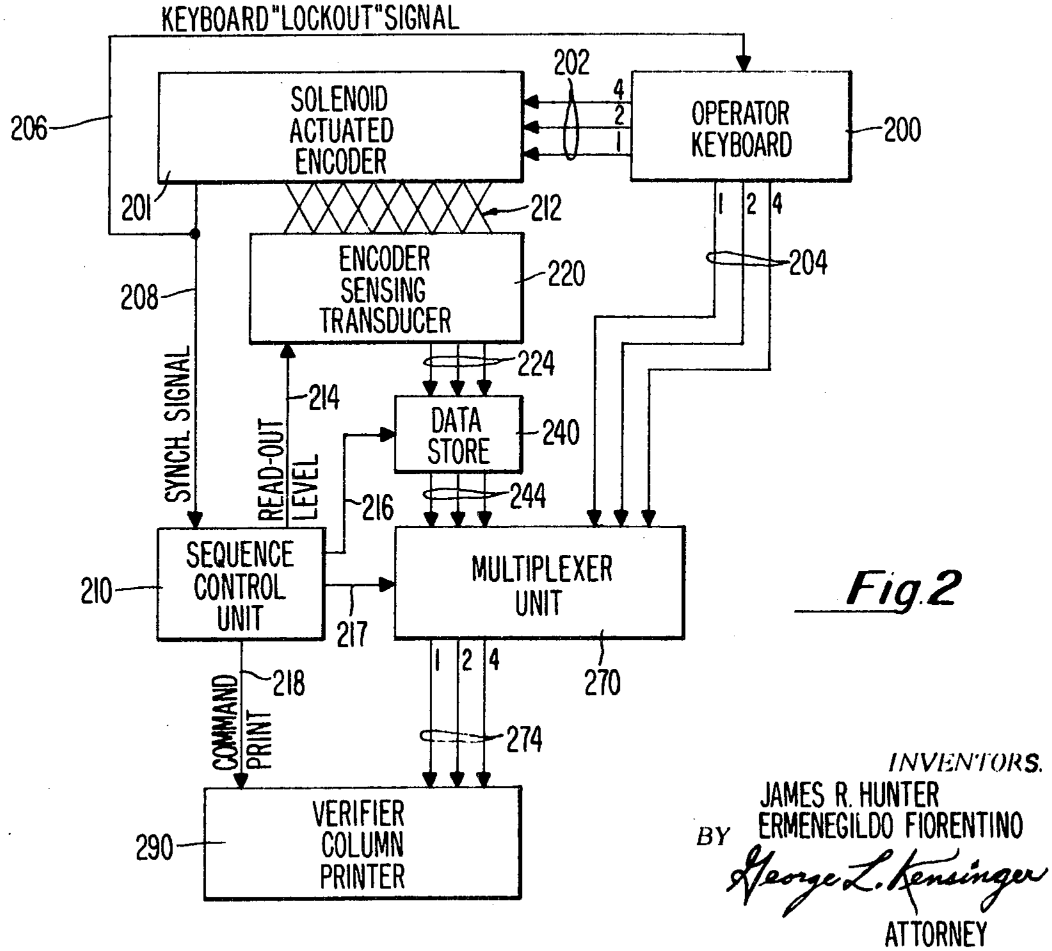
FIG. 2 is an electrical schematic block diagram of verifier apparatus for keyboard-controlled mechanism which provide alternate printout of keyboard and transducer sensed actuation signals.

The verifier apparatus of FIG. 2 includes a sequence control unit 210, an encoder sensing transducer 220 and a data store 240 for encoder sensing data, which are similar to the corresponding units of the verifier of FIG. 1. In FIG. 2 the signal-controlled mechanism of the machine to be verified is a solenoid-actuated encoder 201 controlled by operator keyboard 200 as in a mail-sorting machine.

Sequence control unit 210 may incorporate a plurality of delay multivibrators to provide the delay intervals for the operation sequence. Alternatively, a timing motor assembly having cams for activating switch contacts to initiate the control pulses or to magnetically operate reed-type relays may be incorporated, for example, to control the operation sequence.

Verifier column printer 290 may utilize a series of individually set wheel-type printer elements which may be controlled by a common print command signal. For simplicity of operation, each printer element may be made capable of printing only a particular binary-coded decimal numeral or not printing at all during each cycle. This simplifies both the setting and resetting operations, as only one control pulse is required for each.

Binary-coded decimal output signals from operator keyboard 200 are delivered to the encoder via cable 202 and are delivered to multiplexer 270 over cable 204. Data comparison in the verifier of FIG. 2 is provided by alternately printing keyboard data signals and encoder sensing signals at column printer 290. This printer receives the output of multiplexer unit 270 over cable 274, under the control of print command signals received over conductor 218 from sequence control unit 210. Multiplexer unit 270 first receives keyboard output signals over cable 204 and subsequently receives encoder sensing data signals over cable 244 under control of the sequence control unit.

Figure 3:
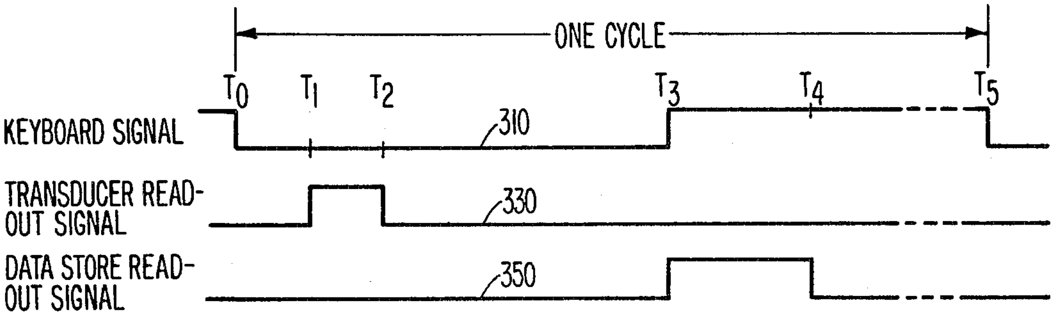
FIG. 3 is a timing diagram of selected pulses provided for controlling the operation of the verifier apparatus of FIG. 2.

The sequence of operation of the verifier of FIG. 2 is indicated by the timing diagram of FIG. 3. Waveform 310 is the keyboard "lockout" or disable signal transmitted from solenoid actuated encoder 201 back to the operator keyboard. At time To waveform 310 changes level to disable output from the keyboard and sequence control unit 210 causes multiplexer unit 270 to transmit keyboard output data signals to verifier column printer 290 to print the previously keyed input data under control of a print command signal on conductor 218.

At time T1, the sequence control unit provides a readout signal level indicated by waveform 330 to encoder sensing transducer 220 via conductor 214. This readout signal level lasts until $T_2$ and causes encoder sensing data signals to be transmitted to data store 240 for storage.

At time $T_3$ the keyboard disable signal terminates, as indicated by waveform 310, and sequence control unit 210 sends a readout signal illustrated by waveform 350 to data store 240 over conductor 216. This data store readout signal lasts until time $T_4$, and causes the encoder sensing signals to be transmitted to the printer via the multiplexer unit.

It is during the interval between T3 and T5 that new data is entered into operator keyboard 200 as indicated by waveform 310. This interval may encompass as much as 90 percent or more of the keying cycle, if desired. If the keyboard is operated at this time, then new keyboard output data signals will be available during the next cycle of the verifier for printing by column printer 290.

Figure 4:
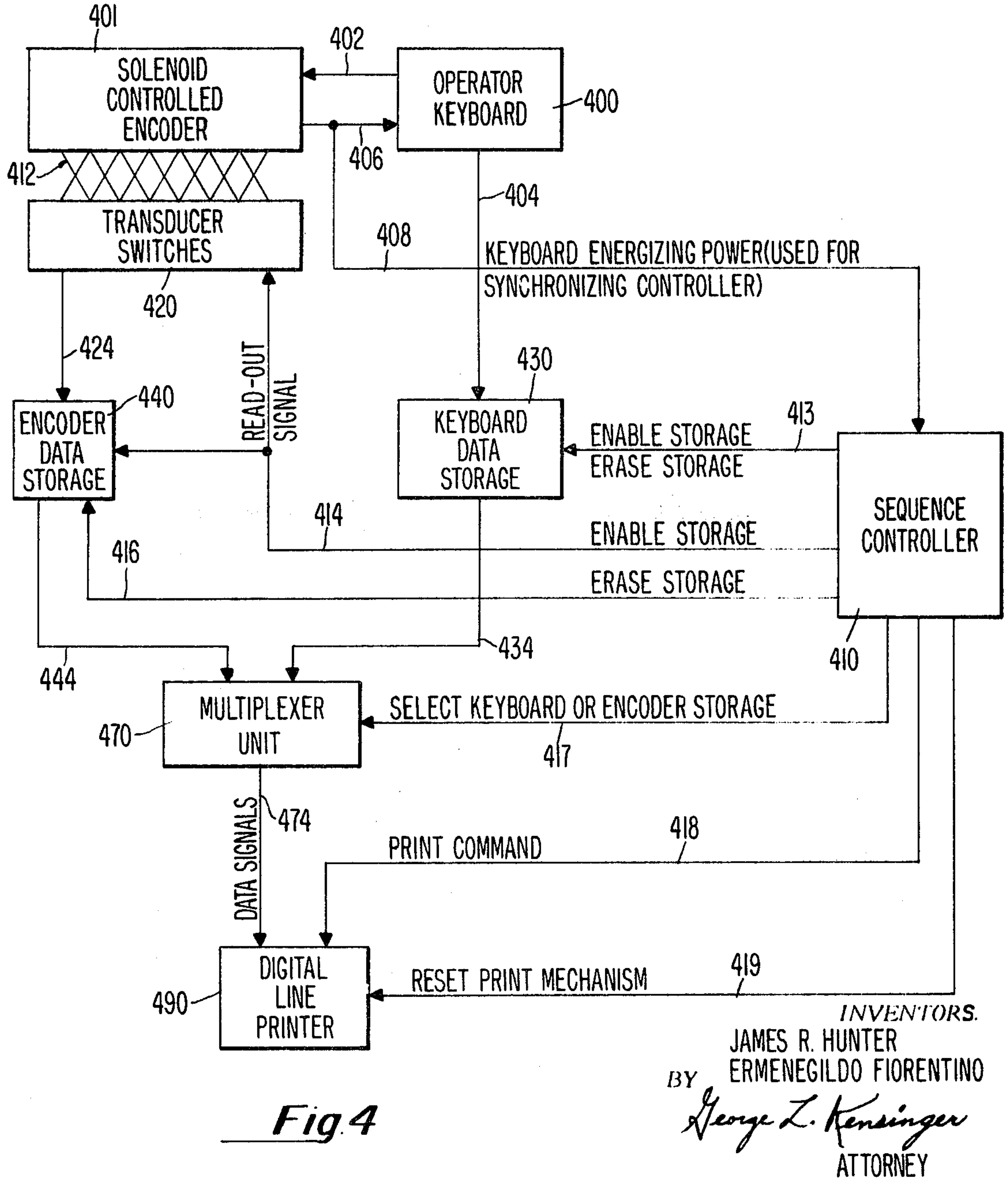
FIG. 4 is a detailed electrical schematic diagram of a printing verifier for keyboard-controlled encoding machines.

In the verifier apparatus of FIG. 4, sequence controller 410, encoder data storage 440, multiplexer unit 470 and digital line printer 490 are similar to the corresponding units of the verifiers of FIGS. 1 and 2. A plurality of transducer switches 420 are physically coupled to solenoid-controlled encoder 401 as indicated at 412. A keyboard data storage 430 is provided for storing keyboard data signals received from operator keyboard 400 through cable 404, and to output these signals on cable 434 under the control of sequence controller 410 transmitted by control cable 413.

In the operation of this verifier, sequence controller 410 causes the keyboard output data signals to be stored by storage 430 while the keyboard is energized by the power level transmitted by conductor 406 to which conductor 408 is connected. At the end of the keyboard-energizing period, sequence controller 410 erases keyboard data storage 430 and the keyboard data signals are transmitted to multiplexer unit 470 which is activated via control cable 417 to deliver them to line printer 490 to be printed. The line printer is then reset by a signal applied to conductor 419 by the sequence control unit.

After erasing keyboard data storage 430, sequence controller 410 reads out transducer switches 420 by a control signal on conductor 414 and causes the transducer data signals to be stored by encoder data storage 440. Subsequently, when keyboard 400 is again energized as indicated on conductor 408, sequence controller 410 erases encoder data storage 440 and causes its output to be transmitted to multiplexer unit 470 under the control of signals on conductor 416. The sensed data signals are then printed by line printer 490 under the control of signals applied by the sequence controller to conductor 418. Line printer 490 is reset by sequence controller 410 through conductor 490 each time after either keyboard data signals or sensed data signals are printed.

Keyboard data storage 430 and encoder data storage 440 may be storage registers of conventional electronic or magnetic design. Multiplexer unit 470 may be any gated multiplexer of conventional design.

Figure 5:
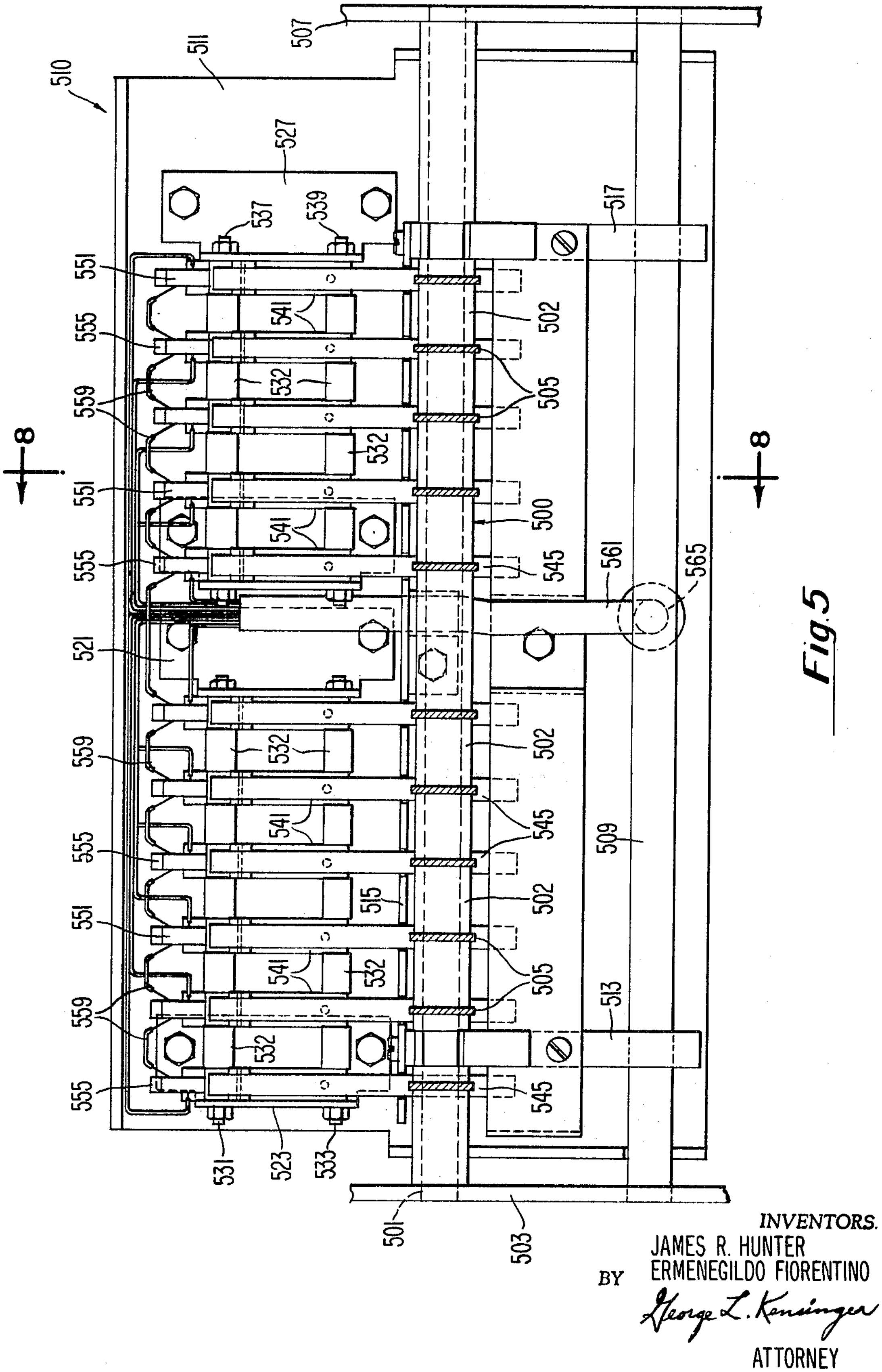
FIGS. 5 and 6 are face and perspective views, respectively, of a transducer switch assembly for the verifier of the invention.

FIG. 5 is a face view of a transducer switch assembly which may be utilized as the encoder sensing transducer 220 of the verifier of FIG. 2, or as the transducer switches 420 of the apparatus of FIG. 4. The transducer assembly is designated generally by the reference numeral "510" and is designed to couple mechanically to a portion of a signal-controlled encoder mechanism which is generally designated by the reference numeral "500." No electrical connection between the transducer switch assembly and the encoder mechanism is required.

The portion of the encoder mechanism illustrated consists of a shaft 501 supported at either end by end plates 503 and 507. Eleven slotted power slides 505, which may be selectively driven by signals received from a keyboard, are positioned on shaft 501 of the encoder and are separated by spacers 502. These power slides are translated on shaft 501 perpendicular to the plane of the drawing. End plates 503 and 507 maintained rigid by shaft 509 to which they are attached.

Transducer switch assembly 510 includes main supporting bracket 511 to which are attached U-shaped bracket 521 and L-shaped brackets 523 and 527. Eleven switch elements 541 are supported by shafts 531, 533, 537 and 539, which in turn are supported by brackets 521, 523 and 527, as illustrated.

Switch elements 541 are separated by spacers 532 on the respective supporting shafts. Each of the switch elements has a switch-actuating arm 545 which can ride on a different one of the power slides 505 of the encoder and sense its movement. A switch arm guide member 515 is attached to main support bracket 511 and aids in assuring contact between the switch-actuating arms 545 and the power slides 505 of the encoder. A pair of supporting blocks 513 and 517 are attached to the main support bracket 511 and have open-ended slots for fitting over shafts 509 and 501 for fixedly attaching the switch assembly to the encoder mechanism.

Each transducer switch element 541 has a pair of connection terminals 551 and 555. Terminals 551 on each of the switches are connected together by jumpers 559, as shown. As unnumbered conductor is connected to each of the switch terminals 555 and together form cable 561 which passes through opening 565 in the switch assembly main support bracket 511.

Figures 6, 7, 8:
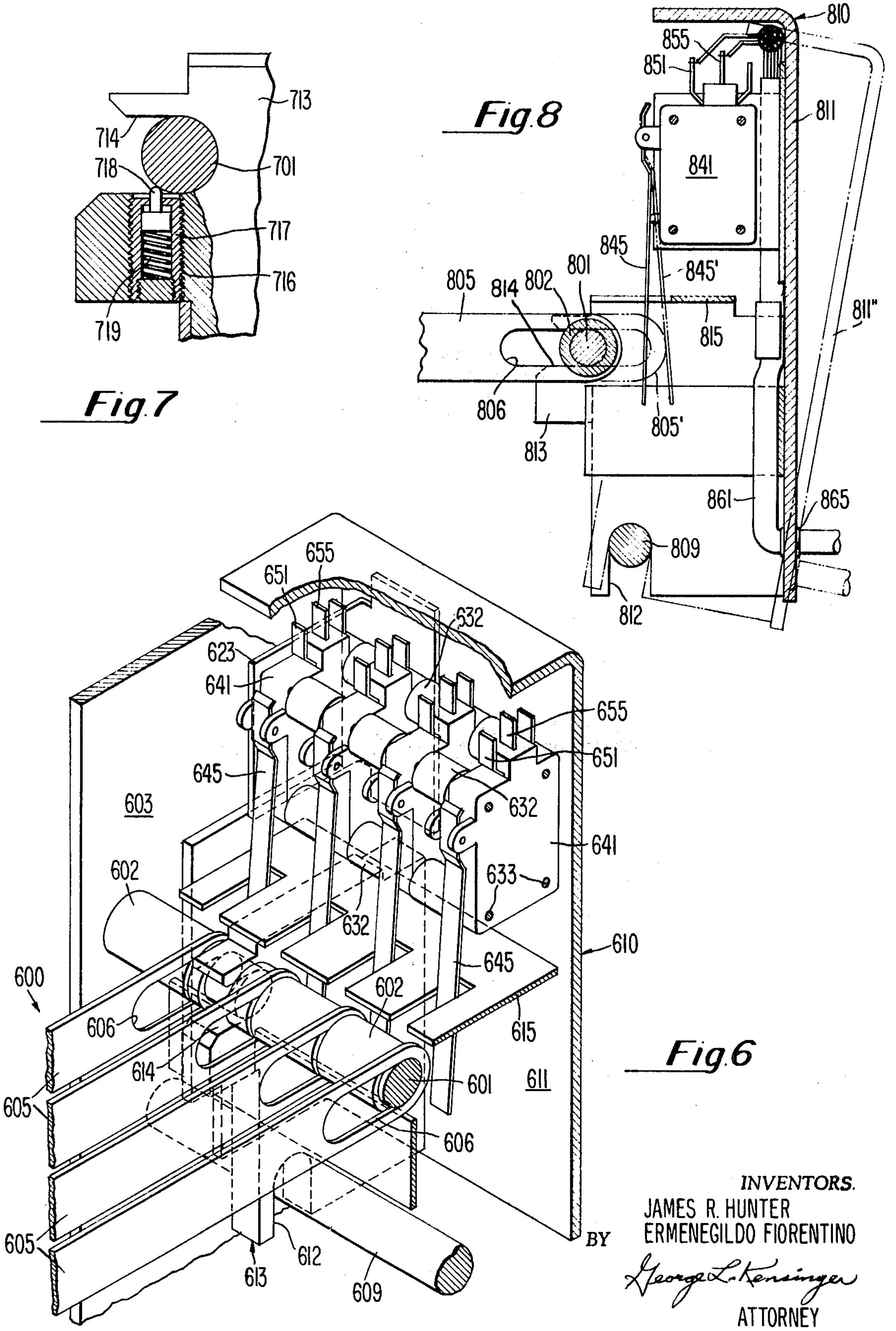
FIGS. 7 and 8 are detailed views of different portions of the transducer switch assembly of the invention.

FIG. 6 is a perspective view of a portion of encoder mechanism 600 and transducer switch assembly 610. Only the first number of the reference numerals for the elements of the apparatus of FIG. 6 are different from the reference numerals of the corresponding elements of FIG. 5 and FIGS. 7 and 8, to be described. The encoder mechanism includes shafts 601 and 609 supported by end plate 603 and selectively drivable power slides 605. Each of the power slides have a slot 606 and each rides on encoder shaft 601, as shown.

Supporting block 613 of the switch assembly has open slots 612 and 614 for fitting about shafts 609 and 601, respectively, of the encoder mechanism.

FIG. 7 shows a detailed view of a portion of supporting block 713 having an open slot 714 which fits into encoder shaft 701, as shown. Supporting block 713 has a tapped opening 716 into which is threaded latch 717 which includes a spring-loaded plunger 718 biased by spring element 719.

FIG. 8 is a detailed end view of one transducer switch element 841 having a switch-actuating arm 845 for sensing translation of power slide 805.

As slide 805 is translated on shaft 801 to position 805', switch lever arm 845 is pivoted to position 845' and actuates switch 841. A signal is transmitted to the data store from the switch by cable 861 connected to its contacts. A readout of the data store is controlled by apparatus such as sequence control unit 210 of the verifier of FIG. 2 or sequence controller 410 of FIG. 4.

Transducer switch assembly 810 is attached to the encoder mechanism by first fitting slot 812 of supporting block 813 onto shaft 809 of the encoder mechanism with the main supporting bracket in position 811″. The transducer switch assembly is then rotated counterclockwise into position 811, at which point slot 814 of the supporting block fits onto encoder shaft 801.

Although specific embodiments of the present invention have been described in detail, it should be understood that the present disclosure has been for example only and that many modifications and variations of the present invention are possible in light of the above teachings. It is, therefore, to be understood that within the scope of the appended claims, the invention may be practiced otherwise than as specifically described.

We claim:

1. Verifier apparatus for a signal-controlled mechanism comprising:

controllable actuation sensing means adapted to be physically coupled to moveable elements of the signal-controlled mechanism for developing sense signals indicative of actuation of the mechanism, a source of input control signals coupled to said mechanism, means coupled to the actuation-sensing means for storing the sense signals developed by it, sequence control means coupled to the signal storage means and responsive to the signal-controlled mechanism for subsequently initiating readout of the contents of the signal storage means, and data comparison means adapted to receive said input control signals and coupled to the data storage means for comparing the sensed data with the input control signals under control of the sequence control means.

2. Verifier apparatus according to claim 1 wherein:

said input control signal source includes a keyboard coupled to said mechanism, said mechanism includes means to disable the keyboard each cycle of operation, and the sequence control means is responsive to the disabling of the keyboard for synchronizing the verifier apparatus with the operation of the mechanism.

3. The verifier apparatus of claim 2 further comprising second data storage means for storing the keyboard data signals and transmitting them to the data comparison means under control of the sequence control means.

4. The verifier apparatus of claim 2 wherein the data comparison means comprises a multiplexer unit for receiving the keyboard data signals and the sense data signals under control of the sequence control means and means coupled to the multiplexer unit for printing the data received from it.

5. The verifier apparatus of claim 4 further comprising second data storage means for storing the keyboard data signals and transmitting them to the multiplexer unit under control of the sequence control means.

6. The verifier apparatus of claim 4 wherein the printing means is a digital column printer which alternately prints the keyboard data signals and the sense data signals received from the multiplexer unit.

7. The verifier apparatus of claim 6 wherein the actuation sensing means develops binary-coded decimal signals in response to actuation of the mechanism and the printing means comprises a plurality of column printer elements for printing different binary-coded decimal digits.

8. The verifier apparatus of claim 4 wherein the actuation-sensing means comprises a plurality of switch elements coupled to be responsive to the actuation of the mechanism.

9. The verifier apparatus of claim 8 wherein the switch elements are lever-operated electrical switches carried by a supporting bracket which latches to the signal-controlled mechanism without affecting its operation.

10. The verifier apparatus of claim 8 wherein each switch element has an actuating arm which rests free of the mechanism and is contacted by a moveable element of the mechanism only when it is actuated.